United States Patent
Ihms

[11] 4,009,951
[45] Mar. 1, 1977

[54] APPARATUS FOR STEREOSCOPIC PHOTOGRAPHY

[76] Inventor: James E. Ihms, 1569 W. Hazelwood, Phoenix, Ariz. 85015

[22] Filed: Dec. 26, 1974

[21] Appl. No.: 536,448

Related U.S. Application Data

[63] Continuation-in-part of Ser. No. 412,760, Nov. 5, 1973, abandoned, which is a continuation-in-part of Ser. No. 375,335, July 2, 1973, Pat. No. 3,846,810.

[52] U.S. Cl. .................................... 353/7; 350/132; 350/138; 352/58; 352/60; 354/117
[51] Int. Cl.² ................. G03B 35/08; G03B 35/18; G02B 27/24
[58] Field of Search ............. 354/117, 112; 352/43, 352/57, 58, 60; 353/7, 10; 350/130, 132, 137, 138

[56] References Cited

UNITED STATES PATENTS

| 1,595,984 | 8/1926 | Ames | 96/40 |
| 2,568,327 | 9/1951 | Dudley | 354/117 |
| 2,751,826 | 6/1956 | Harrison | 354/117 |
| 3,221,599 | 12/1965 | Land | 353/7 |
| 3,256,776 | 6/1966 | Land et al. | 350/132 |

OTHER PUBLICATIONS

*An Astonishing New Theory of Color*, Francis Bello, Fortune Magazine, May 1959 pp. 144-148.

Primary Examiner—Steven L. Stephan
Attorney, Agent, or Firm—Cahill, Sutton & Thomas

[57] ABSTRACT

Photographic apparatus employing a single color filter for use in conjunction with a camera to produce a decodable composite image of a scene, which image has a three dimensional quality when decoded. The composite image is formed of two images, each image representing the scene from a different line of sight.

51 Claims, 7 Drawing Figures

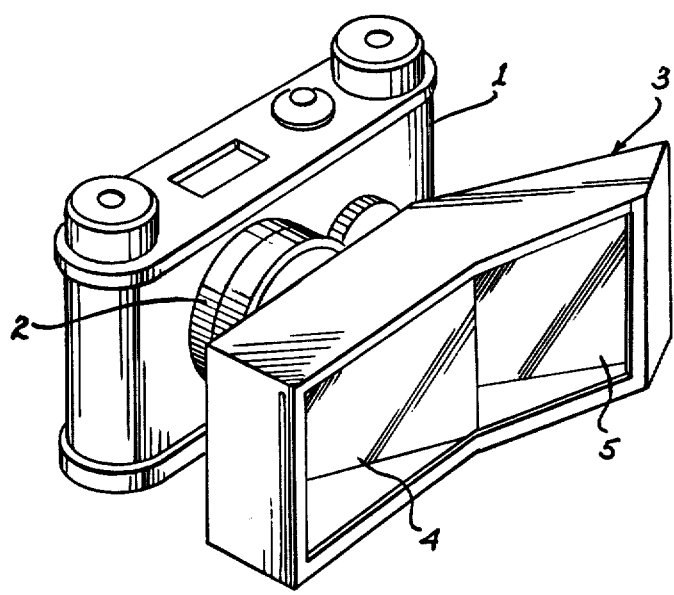
fig. 1
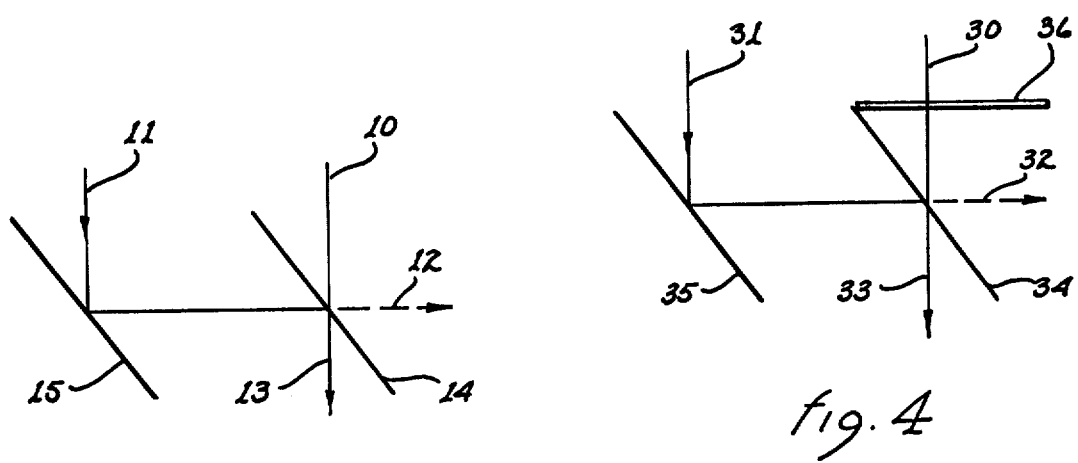
fig. 2
fig. 4
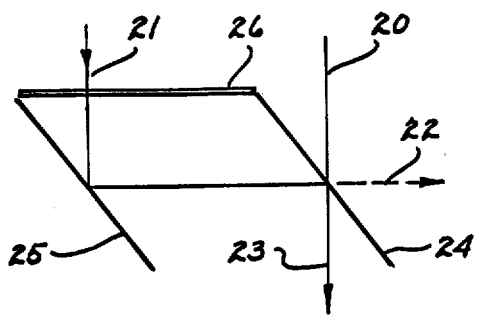
fig. 3

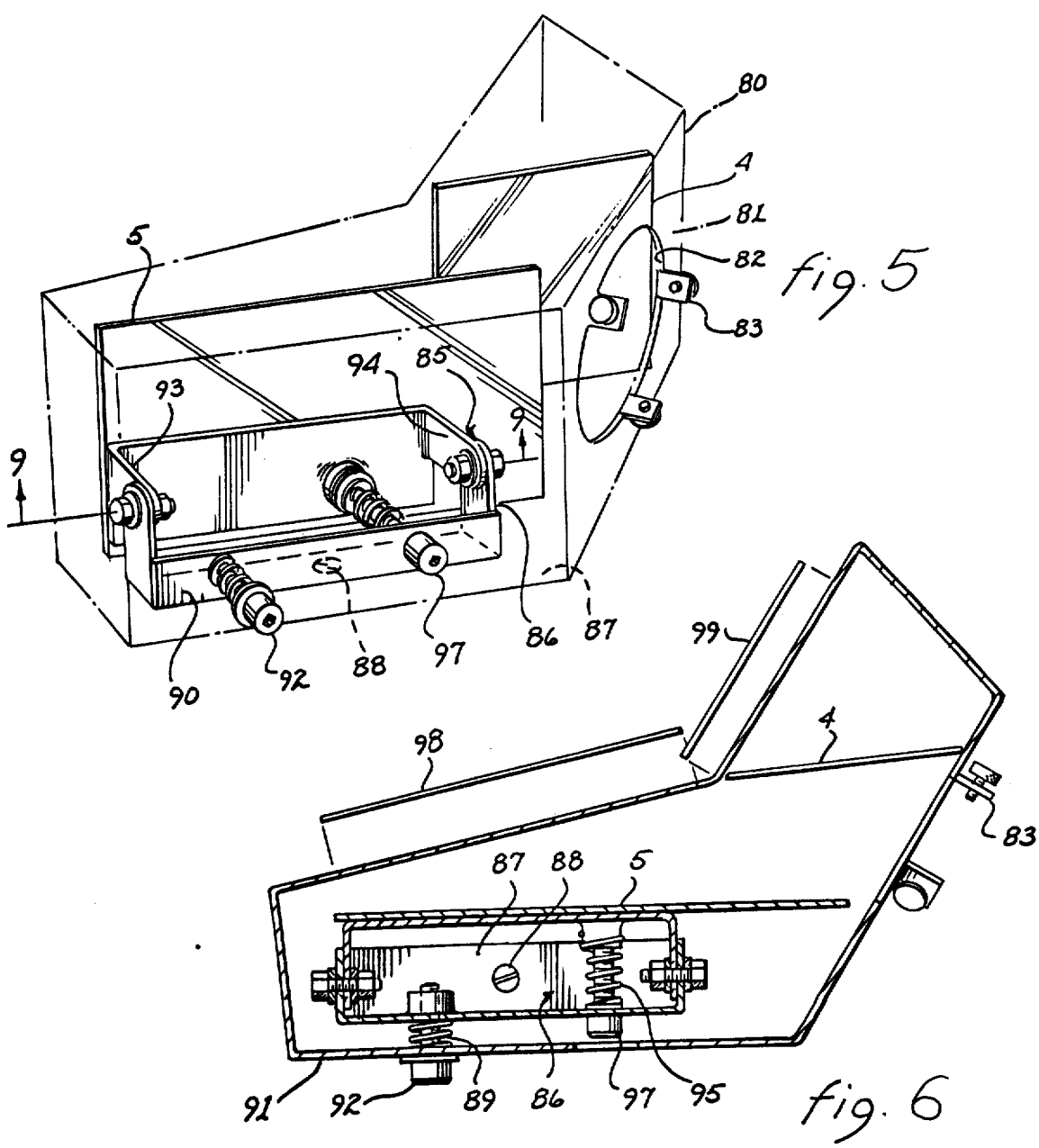

APPARATUS FOR STEREOSCOPIC PHOTOGRAPHY

BACKGROUND OF THE INVENTION

The present application is a continuation-in-part of a patent application entitled "IMPROVED APPARATUS FOR STEREOSCOPIC PHOTOGRAPHY", assigned Ser. No. 412,760 and filed on Nov. 5, 1973, which is continuation-in-part of a patent application entitled "APPARATUS FOR STEREOSCOPIC PHOTOGRAPHY" assigned Ser. No. 375,335, and filed July 2, 1973, now U.S. Pat. No. 3,846,810, both describing related inventions of the present applicant.

The present invention pertains to three dimensional photography and, more particularly, to apparatus attachable to a camera for obtaining a single photographically recorded full color content composite image containing the requisite information content to provide a three dimensional view of a photographed scene.

Stereoscopic photography has had cyclic public appeal since approximately 1839 when the first black and white stereo photographs were made. The stereo concept then employed can be traced to thoughts first propounded by Leonardo da Vinci in 1584.

Traditional stereo photography may be described as follows. Two laterally displaced essentially simultaneously exposed negatives, positives, or impressions in the case of television, are taken to obtain two images of a scene. The images are slightly different because of the lateral displacement, resulting in slightly different lines of sight of the scene. For best real life simulation, the lateral displacement should be equivalent to the distance between the viewer's eyes. The negatives, positives, or impressions are viewed through a stereo opticon device, which device permits each eye to see only one of the images portrayed by the negatives, prints, or impressions. The difference in the two images seen by a viewer is translated by the viewer's brain into a sense of depth to give the viewed scene a three dimensional quality.

If colored images, rather than black and white images, are feasible, image decoding techniques other than physical separation of two images when viewed can be used. The separation may be effected by producing a first image along one line of sight of a scene which is limited in color content by a filter to one half of the visible light spectrum and producing a second image along another line of sight of a scene which is limited in color content by a filter to the remaining half of the visible color spectrum. Each of the two images are combined to form an anaglyph and projected onto a common screen for a movie or slide show, or printed upon a printing medium. The resulting anaglyph is viewed by placing a different color filter in front of each eye. The filters, usually being essentially, but not completely mutually exclusive, permit each eye to see only one of the color limited images of the scene. As each eye only sees one of the images, each eye sees the same scene but as viewed along a slightly different line of sight. Thus, a slight discrepancy exists in the scene presented to each eye. The discrepancy is translated by the brain to provide a sense of depth and hence, provides a three dimensional effect to the scene photographed.

The advances since 1839 in both black and white and color stero photography have been essentially limited to improvements in equipment resulting in greater registration, better optics and improved projection systems. Despite the amount of work done and the many improvements generated, no significant substantive changes in the three dimensional image reproduction have been developed. That is, the methods for effecting stereo photography have remained unchanged by the prior art.

In example, because of the requirement of double negatives in early stereoscopic photography, various devices have been developed to portray the necessary information on a single negative. U.S. Pat. No. 2,639,653 illustrates apparatus using a rotatable disc or sliding diaphragm adjacent to the objective lens to obtain slightly different views of the same scene. A specially constructed viewing device displays one of the views to each eye of the observer. Thus, a stereoscopic effect is achieved.

In U.S. Pat. No. 2,317,875, a plurality of rectangular prisms are employed to form a plurality of picture strips, each strip conveying a part of the picture. Alternative ones of the strips from the total picture are transmitted through a first lens system. The remaining strips from the total picture are transmitted through a second lens system. The stereoscopic effect is obtained by viewing the strip composite through a special viewer, which viewer segregates one set of strips to impinge upon one eye and the other set of strips to impinge upon the other eye.

In the apparatus described in U.S. Pat. Nos. 2,360,322 and 2,751,826, two color segregated images taken along different lines of sight of the same scene are received and simultaneously recorded on the same piece of film. In operation, a first bundle of light rays are transmitted through and limited in color content by a first filter impinging upon one surface of an angled semi-reflecting mirror with some of the light rays being reflected therefrom and the remaining light rays being transmitted therethrough. A second bundle of light rays are transmitted through and limited in color content by a second filter, reflected by a mirror to impinge upon the semi-reflecting mirror with some of the light rays being reflected therefrom and the remaining light rays being transmitted therethrough. The first and second filtered bundle of light rays are essentially mutually exclusive in color content by action of the first and second filters. The light rays of the first bundle transmitted through the semi-reflecting mirror are combined with the light rays of the second bundle reflected by the semi-reflecting mirror to form an anaglyph. The anaglyph is recorded on film and viewed through glasses having filters corresponding to the first and second filters. A disadvantage of this system is that neither image is of full color content. Moreover, the images are not completely mutually exclusive in color as reciprocally exclusive filters cannot be manufactured; thus, color cross talk will be present. Further, less than half of the light content of the light rays transmitted through the corresponding filters and less than half of the light content of the light rays is transmitted through the semi-reflecting surface. Thus, the light content of the composite image striking the film is less than one half of the total light content of the two received light rays.

Semi-reflecting mirrors or surfaces are normally coated with a substance to render them semi-reflecting. The coating substance deteriorates the quality of each image because of the impurities inherent within the coating substance.

A recent U.S. Pat. No. 3,712,199, teaches apparatus for producing an image to provide a psychophysiological illusion of depth. This sytem, contrary to most stereoscopic systems, does not capture two laterally displaced images. Instead, a single line of sight is employed in photographing the object. Within the lens system itself, one half of the received light rays are filtered by a first color filter while the second half of the received light rays are filtered through a second color filter. Both filtered light rays are combined to form an anaglyph. The anaglyph is viewed through colored glasses having each lens corresponding to one of the color filters. Thus, one eye of the viewer can detect only that portion of the anaglyph transmitted through the second color filter of the lens system. As there is no initial lateral separation of the two color segregated images, the anaglyph is not a true three dimensional image but appears to present the illusion of a three dimensional image.

It may be noted that all of the above described apparatus produce a pair of superimposed color mutually exclusive images through use of a pair of mutually exclusive color filters and the resulting anaglyph is viewed through colored glasses having lenses corresponding to the color filters.

The closest prior art known to applicant, and substantiated by Dr. Peter Franken, Director of the Optical Science Center at Arizona State University, is described in an article entitled "An Astonishing New Theory of Color" appearing in the May, 1959 issue of *Fortune*. The article describes the exploratory work performed by Dr. Edwin H. Land in 1955. In essence, Dr. Land obtained a first transparency taken through a red filter and a second combined transparency taken through a green filter and blue filter. The image of the first transparency (first image) was projected onto a screen after being filtered through a red filter. The image of the second transparency (second image) was superimposed onto the first image by projecting it with the aid of a white light source. Both projected images were carefully adjusted to be in registration with one another. The resulting composite image had a full color content which Dr. Land could not explain. Instead, he considered it to be physiological phenomenon as he could not capture it on a light sensitive medium, i.e. film. This work by Dr. Land helped form the basis of the present invention.

Other U.S. patents directed to various three dimensional photographic apparatus include: U.S. Pat. Nos. 475,084; 1,595,984; 2,045,119; 2,386,413; 2,749,820; 2,895,374; 3,642,349; 2,301,254 and 2,568,327

PURPOSE AND SUMMARY OF THE INVENTION

It is therefore a primary object of the present invention to provide apparatus for producing a composite image of a scene, which image has a three dimensional quality.

Another object of the present invention is to provide apparatus for simultaneously superimposing two various color content but full color images of the same scene taken along different lines of sight.

Yet another object of the present invention is to provide a dual input aperture filter system for cameras, which filter system combines a filtered image and white light image of a photographed scene and transmits the combined image to a light sensitive medium.

A further object of the present invention is to provide a means for combining two full color but different color content images coresponding to two views along various lines of sight of the same object to produce a composite decodable image, which image has a three dimensional quality after decoding.

A still further object of the present invention is to provide an attachment for a camera to combine two full color content images into a decodable composite image recordable on the light sensitive medium of the camera.

A yet further object of the present invention is to transform two white light images of a scene into a non-anaglyph composite image formed of two segregable images with a single color filter.

It is also an object of the present invention to provide a means for combining two black and white images, each image corresponding to one of two views taken along different lines of sight of the same object to produce a composite decodable image, which decodable image has a three dimensional quality after decoding.

It is also another object of the present invention to provide a means for combining a black and white image with a color filtered black and white image, each image corresponding to one of two views taken along different lines of sight of the same object to produce a composite decodable image, which decodable image has a three dimensional full color quality after decoding.

These and other objects of the present invention will become apparent to those skilled in the art as the description thereof proceeds.

BRIEF DESCRIPTION OF THE DRAWINGS

The present invention may be described with more specificity and clarity with reference to the following figures, in which:

FIG. 1 illustrates the present invention attached to the lens of a camera.

FIG. 2 illustrates the basic image combining system of the present invention.

FIG. 3 illustrates an embodiment of the system shown in FIG. 2.

FIG. 4 illustrates a further embodiment of the system shown in FIG. 2.

FIG. 5 illustrates a perspective view of a focusing and alignment appratus useable with the present invention.

FIG. 6 illustrated a cross-sectional view of the appartus taken along lines 6—6, as shown in FIG. 5.

DESCRIPTION OF SPECIFIC EMBODIMENTS

Figure 1A:
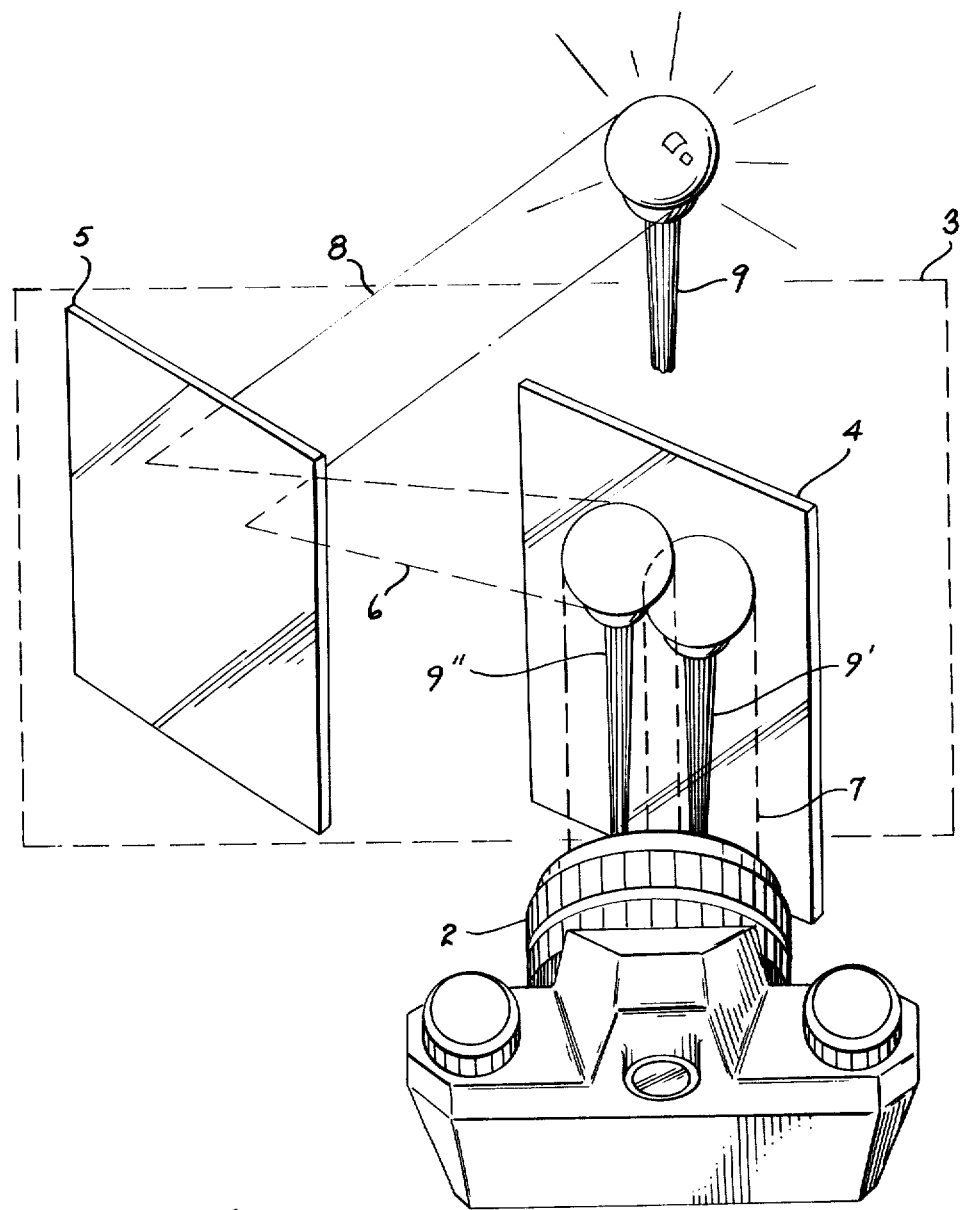
FIG. 1a is a diagramatic illustration of the present invention.

The appearance of three dimensionality in images can be created by superimposing two different views of the same scene to form a composite image. The illusion of depth is often enhanced if the composite image is viewed through an image decoding device. If the two views are laterally displaced from one another by an amount approximately equal to the distance between a viewer's eyes, the resulting image will have essentially the same three dimensional appearance as if the viewer were seeing the scene personally. Where the separation is greater than that between the viewer's eyes, the three dimensional effect is exaggerated. Similarly, if the distance is less, the three dimensional effect is minimized. The composite is in register at the point where the two lines of sight cross one another. Those elements of the scene being closer or further away, will be out of register. This situation is similar to that which occurs in real life.

Referring to FIG. 1, there is shown apparatus incorporating the present invention and used in conjunction with a camera for obtaining a composite image of a scene, which scene is viewed along two different lines of sight. Camera 1, which may be a highly complex instrument or a very simple camera, such as those camera sold by the Eastman Kodak Company under the trademark "Instamatic", includes a lens system 2. A housing 3 is detachably secured to the lens system. The exact means and mode of attaching the housing may, of course, be varied to suit the lens system.

Housing 3 includes a light interacting surface, such as light transmissive element 4, which element may be a color filter or a smooth surfaced transparent element and a light reflective element 5, which may be a mirror. The distance between the centers of elements 4 and 5 is approximately two and one half inches, or, the average distance between a person's pupils. For special needs or effects, the distance may be increased or decreased.

An illustration of the operation of the present invention is shown in FIG. 1a. A first bundle of light rays from object 9 will impinge upon the front surface of light transmissive element 4. At least a part of the first bundle of light rays will be transmitted therethrough into lens system 2 into camera 1. The transmitted first bundle of light rays is identified by numeral 9' and will define a first image of object 9. A second bundle of light rays, identified by numeral 8, will impinge upon light reflective element 5. The second bundle of light rays 8 are reflected by light reflective element 5 to the rear surface of light transmissive element 4 and define a second image identified by numeral 9".

In the embodiment illustrated in FIG. 1a, the light transmissive element is a color filter such as a red filter. Hence, the first bundle of light rays impinging upon the red filter is modified in color content by the filtering action of the red filter. It now becomes evident that each of two bundles of light rays, which differ in color content, intersect one another at the light transmissive element 4.

When two light beams intersect one another at a light transmissive surface (i.e. light transmissive element 4), an interaction of the light beams will occur. That is, the light beams will serve as mutual color filters for one another such that each of the reflected and transmitted beams of light of each impinging beam of light will be altered in color content. This is a theory of the inventor which constitutes an explanation of the results set forth herein. Thus, the images identified by numerals 9' and 9" correspond to the image presented by the first and second bundle of light rays, respectively, except as modified in color content by the light interaction occurring at transmissive element 4.

More specifically, the first bundle of light rays has been limited in color content to one segment of the visible light spectrum. This first bundle of light's rays, interacting with the second bundle of light rays will tend to modify the color content of the latter. Conversely, the second bundle of light rays, being initially essentially white light, will modify or add to the color content of the first bundle of light rays because of the light interaction occurring at transmissive element 4. Thus, each of images 9' and 9" are not limited in color content to one or another half of the visible light spectrum. Instead, each image 9' and 9" may contain a full range of colors.

By experiment, it has been learned that the composite image formed by images 9' and 9" contains two full color images, one corresponding in subject content to the first bundle of light rays and the other corresponding in subject content to the second bundle of light rays. The two images, after being recorded on a photo sensitive medium as the composite image, are segregable from one another by viewing the composite image through a pair of glasses having a red and a cyan lens. When so viewed, the composite image has the depth of a three dimensional representation.

The light paths within housing 3 are shown schematically in FIG. 2. A first light ray 10 emanating from an object to be photographed is received by and transmitted through light transmissive element 14. If light transmissive element 14 is a color filter, it will transmit the filtered light rays of the first light ray 10 which form a part of the bundle of light rays identified as composite ray 13.

A second light ray 11 represents the light rays emanating from the same object as light ray 10. However, light ray 11 is angularly displaced from light ray 10, which displacement results in some differences in subject matter content between the two rays. The totality of light ray 11 is reflected by light reflective element 15 to the light transmissive element 14. If the light transmissive element 14 is a red color filter, it will reflect some of the light rays of the second light ray 11 which form a part of the bundle of light rays identified as composite ray 13. Numeral 12 identifies the light rays of light ray 10 and the transmitted light rays of light ray 11.

From the above description, it may be understood that the color content of the contributions to composite ray 13 of light rays 10 and 11 are altered in color content such that each of the images represented therein is of full color content.

In the preferred embodiment, the light transmissive element has been selected as a red color filter because it comes close to transmitting half of the visible light rays from a white light source and reflecting the remaining visible light rays. Hence, it is believed that the most complete interaction of light rays will therefore occur at light transmissive element 14. However, it is to be understood that other color filters may be employed without departing from the teachings of the present invention.

The information contained within composite light ray 13 is sufficient to produce two superimposed images of an object where each image portrays the object as seen along one of two angularly displaced views. One image is formed by the light rays transmitted through a filter while the other image is formed by the light rays reflected by the same filter. These images are recorded upon a light sensitive medium.

The illumination provided by either light rays 10 and 11 is diminished by the light transmissive element 14. However, as the light rays of light ray 10 that are filtered by the red filter are combined with the reflected light rays of light ray 11, the composite light ray 13 includes essentially the same illumination as either of light rays 10 or 11. Thus, the aperture or speed of the lens system 2 of camera 1 (see FIG. 1) using the present invention may not need to be adjusted to accommodate the filtering of the incoming light rays.

The photographic recording medium, either positive or negative color film, within the camera exposed by composite light ray 13 will respond to the composite light ray and record both images thereon as a composite image. The images will be essentially in registration and the resulting positive or print will be of acceptable quality for general viewing purposes. When the positive is projected onto a screen for viewing or when a print of the negative or positive is viewed, the viewer may or may not obtain a sensation of third dimensionality. If the sensitivity of the viewer's eyes are mis-matched in color sensitivity, a sense of three dimensionality may be readily apparent. To obtain the full effect of a third dimension of the photographed object, the viewer should don a pair of glasses having a blue content lens and a red content lens. The red content lens should be used in front of the eye corresponding to light ray 10 while the blue content lens should be used in front of the eye corresponding to the light ray 11. With this arrangement, one of the viewer's eyes will see the object as conveyed by light ray 10 and the other eye will see the object as conveyed by light ray 11. As each eye sees the object from a different vantage point, or line of sight, the object will appear to be dimensional. That is, the composite image will have depth.

Although the light ray interaction process which occurs at the intersection of the two intersecting light rays is not fully and wholly understood, a hypothesis has been developed. It is known that the light rays from a light source are changed or altered in color and/or tone content to one range of the visible light spectrum when the light rays are reflected from the surface of a color filter; similarly, the light rays are changed or altered in color and/or tone content to another range of the visible light spectrum when the light rays are transmitted through same color filters. As a result, a color filter is capable of producing two different color content images, depending on whether the received image is reflected from or transmitted through the color filter. Based upon the above knowledge, it is hypothesized that the following phenomenon occurs at the plane of interaction between the two intercepting light rays.

The light or image transmitted through the color filter contains areas having the color of the color filter and non-light areas representative of the reflected complementary color (i.e. if the color filter is red, the transmitted image contains red and not light areas representative of blues, greens and yellows of the original image). The light rays from the white light image intercept the filtered light rays. Due to the interaction of the intercepting light rays, the color filter complementary colors (i.e. blues, greens and yellows) impinging upon the non-light areas of the filtered light ray are reflected. Thus, the filtered image striking the recording medium contains the color of the light transmitted through the color filter and the complementary colors introduced by the non-filtered image and reflected by the non-light areas at the plane of interaction. A similar but reversely operating color discrimination process occurs for the received non-filtered image. That is, all of the colors of the non-filtered image are reflected at the plane of interaction to form one image of the composite, which colors are complementary to the filter. The non-complimentary colors are not reflected as they are transmitted through the filter. Hence, they represent non-light areas of the image. These non-light areas will, however, appear to have color due to the addition of color provided by the colors of the filtered image transmitted through the filter at the locations of the non-light areas. Thereby, the image contributed by the received and initially filtered image and the received initially non-filtered image to the composite image each contains full color. Each image of the composte image will have full color and can be selectively viewed through a colored eye-piece (red for the initially filtered image and blue for the initially non-filtered eyepiece if the filter is red colored).

In further explanation, one could categorize the color combining phenomenon as employing both additive and subtractive color processes. That is, a non-light area will appear as the complementary color of the filter yet the light areas will appear in various colors and transmit the correct amount of light through the color filter (non-light areas appearing as blue will appear black when added to a red filter, subtractive color, red areas of the same image will appear as light through the same red filter, additive color).

By comparison with prior art devices, the distinction thereover becomes self evident. The prior art composite image was formed as an anaglyph (two mutually exclusive color content images superimposed on one another) and viewing through eye pieces complementary to the filters.

Another embodiment of the present invention is shown in FIG. 3. A pair of light rays 20 and 21 angularly displaced but emanating from the same object essentially correspond to light rays 10 and 11, respectively. The light transmissive element 24 is a transparent smooth surfaced element. Light ray 20 is passed through and filtered at element 24 by the interaction of intercepting light rays and becomes a part of composite ray 23. Light ray 21 is passed through a non-mutually exclusive color filter 26, which filter may be of any chosen color. Light ray 21 is partially reflected by light reflecting element 25 to element 24. The reflected light rays of light ray 21 become a part of composite light ray 23 due to the interaction of light rays and are transmitted through the lens system into the camera. The content of composite light ray 23 will be a composite of the mechanically filtered and reflected light rays contained within light ray 21 and the unfiltered light rays contained within light ray 20, both of which are modified in color content due to the interaction of light rays at element 24. Thus, light ray 23 contains sufficient infomeation to form a pair of full color content images, each corresponding to the information contained by one of the incoming light rays. The reflected portion of light ray 20 and transmitted portion of light ray 21 are depicted by numeral 22.

When light ray 23 impinges upon a color sensitive medium, such as a color positive or print, a composite of the two superimposed images will be formed simultaneously. The two images are segregable if the composite image is viewed through a pair of glasses having a red content filter for one lens and a blue content filter for the other lens. The orientation of the filters must match the orientation of rays 21 and 20. One of the viewer's eyes will see the image conveyed by light ray 21 while the other eye will see the image conveyed by light ray 20. The somewhat different images will be converted by the viewer's brain to provide a sense of three dimensionality to the composite image.

Referring to FIG. 4, there is shown a further embodiment of the present invention described with respect to FIG. 2. Herein, a light ray 30, emanating from an object, directly impinges upon and is filtered by a color filter 36. A part of this light ray is transmitted through a transparent, smooth surfaced element 34. The reflected part of light ray 30 is identified by numeral 32.

The filtered and transmitted part of light ray 30 forms a part of composite light ray 33. Ray 31, emanating from the same object as light ray 30 but along a different line of sight, is reflected by reflecting element 35 to transparent smooth surface element 34. A part of light ray 31 is again reflected by transparent smooth surface element 34 and forms the remaining part of composite ray 33. The transmitted part of light ray 31 is identified by numeral 32. Partial reflection and transmission of light rays 30 and 31, repesctively, occur at element 34 due to the interaction of the two intersecting light rays. The composite image formed by composite ray 33 is recorded upon color sensitive film to produce a composite image. The two images of the composite image, when viewed, are segregated by viewing the composite image through a pair of filtered glasses as described above. Thus, each eye of the viewer will receive the information content of one of light rays 30 or 31.

If the distance between the two apertures needs to be reduced to less than that possible with the above described two element system, a simplified system is still feasible which implements the use of interaction of light in conjunction with a single color filter. By splitting the incoming light within a camera lens into a left and right side and filtering one side (such as the right side with a red-orange filter) a composite image of the filtered and unfiltered images will be formed on the light sensitive recording medium (film). The composite image will be an image containing the net result of the interaction of light between the filtered and unfiltered images. Neither image forming the composite image will be mutually exclusive in color and composite image will posses a three dimensional quality. Thus, such a camera lens system produces the same results as the above described embodiment but requires less lateral displacement.

As described in U.S. Pat. No. 3,846,810, which describes an invention of mine, various means may be incorporated for color correction and light path length extension and attenuation.

From experimentation with the apparatus of the present invention, it has been learned that a full color decodable composite image having a three dimensional quality can be obtained from two black and white positives. A first one of the black and white positives of an object is obtained by conventional means. The second one of the black and white positives of the object is taken through a color filter and along a slightly laterally spaced line of sight. To obtain the composite image, the first positive is placed in one of light paths 11, 20 or 31 and the second positive is placed in one of light paths 10, 21 and 30, depending on whether the apparatus shown in FIGS. 2, 3 or 4 is used. A light source placed rearwardly of each positive projects the image of the respective positive along one of the identified light paths. The first and second images produced from the first and second positives are combined in an interacting relationship at element 14, 24 or 34, depending on which apparatus is employed. The resulting composite image (light ray 13, 23 or 33) has a full color content which is directly viewable or recordable upon a color sensitive recording medium. Moreover, the same interaction can also be applied to pairs of previously nonfilterd black and white or colored images, which have been obtained of a scene along slightly divergent lines of sight (i.e. by conventional double image stereoscopic cameras).

It is to be understood that the separate elements shown in FIGS. 2-4 may be combined in a single monolithic structure, such as prism, without departing from the teachings of the present invention. Similarly, anti-reflective coatings may be employed on the surfaces of the light reflecting and light transmitting elements to reduce distortion created by refraction.

The housing 3 is shown in further detail in FIGS. 5 and 6. It is formed by a housing 80 containing the various previously discussed light transmissive and light reflective elements as well as the various filters when the latter are employed. An aperture 82 is disposed in the rear surface 81 to receive the lens system of a camera. Retaining elements, representatively shown and identified by numeral 83 secure the housing 3 to the lens system. It is to be understood that the retaining means 83 may be varied to suit particular applications.

The light transmissive element (identified in FIGS. 2-4 as element 14, 24, 34, respectively) is normally firmly lodged within housing 80 to intersect the viewing angle of the lens system 2. The reflecting element 5 (identified in FIGS. 2-4 as elements 15, 25, 35, respectively ) is normally pivotably mounted within housing 80 by mounting mechanism 85. It is to be understood that elements 4 and 5 could be permanently, removably or adjustably mounted within housing 3.

The mounting mechanism 85 may be formed by a yoke 86 pivotally secured to base 87 at pivot point 88. A spring biased adjustment screw mechanism 89 is disposed intermediate a flange 90 extending upwardly from the base of yoke 86 and side 91 of housing 80. As is well known to those skilled in the art, the turning of screw 92 will cause yoke 86 to pivot about its pivot point 88. Thus, adjustment mechanism 89 may be used to obtain registration between the two received images.

The rear surface of reflecting element 5 includes a pair of flanges 93 and 94 extending rearwardly therefrom and forming a part of mounting mechanism 85. Each of these flanges is pivotally mounted upon one of the arms of yoke 86. A second adjustment mechanism 95 may be disposed intermediate flange 90 extending from the base of yoke 86 and the rear surface of reflecting element 5. By turning the screw 97 of the adjustment mechanism 95, reflecting surface 5 pivots about the pivot point intermediate flanges 93 and 94 and the arms of yoke 86. In this manner, vertical alignment of the reflected element 5 with respect to the transmissive element 4 may be obtained.

The previously discussed filters may be configured to mate with the front of housing 3, as shown in FIG. 6. A first filter 99 is disposed across the light ray path striking transmissive element 4 without also impeding upon the light ray striking element 5. Similarly, a second filter 99 is secured to the front of housing 3 to intercept the light ray path striking reflective element 5 without also impeding upon the light ray striking transmissive element 4.

The present invention may also be used as a decoder to permit a person to view the positives or color prints without the need of specially filtered glasses and yet obtain the effect of a three dimensional image. If a person holds the housing 3 in front of his eyes so that light transmissive element 5 is in front of one eye and light reflective element 4 is in front of the other eye, and light from the positive or print enters through aperture 32, the housing (or decoder) will segregate the two images. One eye will receive one image while the other eye receives the other image. As discussed above, the person's brain will attribute a sense of three dimensionality to image viewed because of the two similar but not identical images.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for simultaneously combining a first non-color filtered image of an object and a second non-color filtered image of the object to form a non-anaglyph colored composite image having a three dimensional quality, said first and second images being received by said apparatus along first and second light ray paths, respectively, said first and second light ray paths being angularly displaced from one another, said apparatus comprising in combination:
   a. a light reflective means intercepting the first light ray path for reflecting said first image along a third light ray path to intersect said second light ray path;
   b. color filter means for color filtering only one of said first and second images;
   c. combining means disposed at the intersection of said second light ray path and said third light ray path for combining said second image and said reflected first image, said combining means being angularly oriented to transmit a part of said first image along an extension of said third path and to reflect the remaining part of said first image along an extension of said second path to become a portion of said composite image and to transmit a part of said second image through said combining means along said extension of said second path to become the remaining portion of said composite image and to reflect the remaining part of said second image along said extention of said third path; and
   d. means for displaying said composite image; whereby, an interaction of light results at said combining means between the color filtered one and the non-color filtered one of said first and second images to produce said composite image formed of two non-mutually color exclusive colored images.

2. The apparatus as set forth in claim 1 wherein said combining means comprises said color filter means.

3. The apparatus as set forth in claim 2 wherein said color filter means comprises a red content color filter.

4. The apparatus as set forth in claim 2 wherein said color filter means comprises a blue content color filter.

5. The apparatus as set forth in claim 2 wherein said displaying means comprises exposed color sensitive photographic film.

6. The apparatus as set forth in claim 1 including means for equalizing the length of the light paths of said first and second images within said apparatus.

7. The apparatus as set forth in claim 1 wherein said color filter means is disposed within the first light ray path intermediate the object and said light reflective means for color filtering said first image.

8. The apparatus as set forth in claim 7 wherein said combining means comprises a transparent smooth surfaced element.

9. The apparatus as set forth in claim 8 wherein said color filter means comprises a red content color filter.

10. The apparatus as set forth in claim 8 wherein said color filter means comprises a blue content color filter.

11. The apparatus as set forth in claim 8 wherein said displaying means comprises exposed color sensitive photographic film.

12. The apparatus as set forth in claim 1 wherein said color filter means is disposed within the second light ray path intermediate the object and said combining means for color filtering said second image.

13. The apparatus as set forth in claim 12 wherein said combining means comprises a transparent smooth surface element.

14. The apparatus as set forth in claim 13 wherein said color filter means comprises a red content color filter.

15. The apparatus as set forth in claim 13 wherein said color filter means comprises a blue content color filter.

16. The apparatus as set forth in claim 13 wherein said displaying means comprises exposed color sensitive photographic film.

17. Apparatus for simultaneously combining a first non-color filtered image of an object with a second non-color filtered image of the object to form a non-anaglyph full color composite image having a three dimensional quality, said first and said second images being images of the object along converging lines of sight of the object, said apparatus comprising in combination:
   a. color filter means for color filtering only said first image;
   b. combining means for combining said color filtered first image with said non-color filtered second image to form said composite image resulting from an interaction of light between said color filtered first image and said non-color filtered second image; and
   c. displaying means for displaying said full color content composite image resulting from the interaction of light between said color filtered first image and said non-color filtered second image.

18. The apparatus as set forth in claim 17 wherein said first and second images are in color.

19. The apparatus as set forth in claim 17 wherein said first and second images are in black and white.

20. A method for simultaneously combining a first non-color filtered image of an object and a second non-color filtered image of the object to form a non-anaglyph colored composite image having a three dimensional quality, said method comprising the steps of:
   a. receiving the first image along a first light ray path and receiving the second image along a second light ray path angularly displaced from the first light ray path;
   b. directing the first and second images along light ray paths to intercept one another;
   c. color filtering only one of the first and second images;
   d. combining a part of the color filtered one of the first and second images with a part of the non-color filtered one of the first and second images at the point of interception between the first and second images to form said composite image; and
   e. displaying the composite image.

21. A method for simultaneously combining a first image of an object and a second image of the object to form a non-anaglyph full colored composite image having a three dimensional quality, said method comprising:
   a. receiving said first and second images along said first and second light ray paths, respectively;
   b. said first and second light ray paths being angularly displaced from one another;
   c. reflecting said first image along a third light ray path by intercepting the first light ray path with a light reflective means to intersect said second light ray path;
   d. color filtering only one of said first and second images with a color filter means;
   e. combining said second image and said reflected first image with combining means being disposed at the intersection of said second light ray path and said third light ray path;
   f. transmitting a part of said first image along an extension of said third path and reflecting the remaining part of said first image along an extension of said second path with said combining means being angularly oriented to become a portion of said composite image and to transmit a part of said second image through said combining means along said extension of said second path to become the remaining portion of said composite image and to reflect the remaining part of said second image along said extension of said third path; and
   g. displaying said composite image whereby an interaction of light results at said combining means between the color filtered one and the non-color filtered one of said first and second images to produce said non-anaglyph, full colored composite image formed of two non-mutually color exclusive colored images.

22. A method for simultaneously combining a first non-color filtered image of an object with a second non-color filtered image of the object to form a non-anaglyph full color composite image having a three dimensional quality, said first and second images being images of the object along converging lines of sight of the object, said method comprising in combination:
   a. color filtering only said first non-color filtered image with color filter means to obtain a color filtered first image;
   b. combining said color filtered first image with said non-color filtered second image to form said composite image resulting from an interaction of light between said color filtered first image and said non-color filtered second image; and
   c. displaying said full color content composite image resulting from the interaction of light between said color filtered first image and said non-color filtered second image.

23. A method for simultaneously combining one image of an object with another image of the object, said method comprising:
   a. directing said one image along a first light ray path;
   b. directing said other image along a second light ray path that intersects said first light ray path;
   c. placing a color filter means along only one of the light ray paths before the light ray paths intersect to form one color filtered image; and
   d. combining said color filtered image from said only one light ray path with the image from the other light ray path to form a non-anaglyph, full colored composite image having a three-dimensional appearance.

24. A method for simultaneously combining one image of an object with another image of the object, said method comprising:
   a. directing said one image along a first light ray path;
   b. directing said other image along a second light ray path that intersects said first light ray path;
   c. placing a color filter means along only one of the light ray paths before the light ray paths intersect to form one color filtered image;
   d. combining said color filtered image from said only one light ray path with the image from the other light ray path to form a non-anaglyph, full colored composite image having a three-dimensional appearance; and
   e. displaying said non-anaglyph composite image.

25. A method for simultaneously combining one non-color filtered black-and-white image of an object with another non-color filtered black-and-white image of the object to form a color composite image, said method comprising:
   a. directing said one image along a first light ray path;
   b. directing said other image along a second light ray path that intersects said first light ray path;
   c. placing a color filter means along only one of the light ray paths before the light ray paths intersect to form one color filtered image;
   d. combining said color filtered image from said only one light ray path with the non-color filter affected image from the other light ray path to form a colored composite image; and
   e. displaying said color composite image on a recording medium.

26. An apparatus for simultaneously combining one image of an object with another image of the object, said method comprising:
   a. means for directing said one image along a first light ray path;
   b. means for directing said other image along a second light ray path that intersects said first light ray path;
   c. a color filter means disposed along only one of the light ray paths before the light ray paths intersect to form one color filtered image; and
   d. means for combining said color filtered image from said only one light ray path with the image from the other light ray path to form a non-anaglyph, full colored composite image having a three-dimensional appearance.

27. The apparatus as set forth in claim 26 wherein said combining means comprises said color filter means.

28. The apparatus as set forth in claim 26 wherein said color filter means comprises a red content color filter.

29. The apparatus as set forth in claim 26 wherein said color filter means comprises a blue content color filter.

30. The apparatus as set forth in claim 26 including means for color correction disposed along one of said light ray paths.

31. The apparatus as set forth in claim 26 including means for equalizing the length of the light paths of said first and second images within said apparatus.

32. The apparatus as set forth in claim 26 wherein said color filter means is disposed within the first light ray path intermediate the object and said combining means for color filtering said first image.

33. The apparatus as set forth in claim 32 wherein said combining means comprises a transparent smooth surfaced element.

34. The apparatus as set forth in claim 26 wherein said color filter means is disposed within the second light ray path intermediate the object and said combining means for color filtering said second image.

35. An apparatus for simultaneously combining one non-color filtered image of an object with another non-color filtered image of the object, said method comprising:
   a. means for directing said one image along a first light ray path;
   b. means for directing said other image along a second light ray path that intersects said first light ray path;
   c. a color filter means disposed along only one of the light ray paths before the light ray paths intersect to form one color filtered image;
   d. means for combining said color filtered image from said only one light ray path with the image from the other light ray path to form a colored composite image having a three-dimensional appearance; and
   e. means for displaying said composite image.

36. The apparatus as set forth in claim 35 wherein said displaying means comprises exposed color-sensitive photographic film.

37. The apparatus as defined in claim 35 wherein said combining means comprises said color filter means.

38. The apparatus as set forth in claim 35 wherein said color filter means comprises a red content color filter.

39. The apparatus as set forth in claim 35 wherein said color filter means comprises a blue content color filter.

40. The apparatus as set forth in claim 35 wherein said displaying means comprises exposed color sensitive photographic film.

41. The apparatus as set forth in claim 35 including means for equalizing the length of the light paths of said first and second images within said apparatus.

42. The apparatus as defined in claim 35 wherein said color filter means is disposed within the first light ray path intermediate the object and said combining means for color filtering said first image.

43. The apparatus as defined in claim 42 wherein said combining means comprises a transparent smooth surfaced element.

44. The apparatus as defined in claim 35 wherein said color filter means is disposed within the second light ray path intermediate the object and said combining means for color filtering said second image.

45. The apparatus as defined in claim 35 including means for color correction disposed along one of said light ray paths.

46. Apparatus for simultaneously combining a first image of an object and a second image of the object to form a non-anaglyph colored composite image having a three dimensional quality, said first and second images being received by said apparatus along first and second light ray paths, respectively, said first and second light ray paths being angularly displaced from one another, said apparatus comprising in combination:
   a. a light reflective means intercepting the first light ray path for reflecting said first image along a third light ray path to intersect said second light ray path;
   b. color filter means disposed at the intersection of said second light ray path and said third light ray path for combining said second image and said reflected first image, said color filter means being angularly oriented to transmit a part of said first image along an extension of said third path and to reflect the remaining part of said first image along an extension of said second path to become a portion of said composite image and to transmit a part of said second image through said color filter means for color filtering said part of said second image along said extension of said second path to become the remaining portion of said non-anaglyph composite image and to reflect the remaining part of said second image along said extension of said third path; and
   c. means for displaying said non-anaglyph, colored composite image; whereby, an interaction of light results at said color filter means between the color filtered part of said second image and the reflected remaining part of said first image to produce said non-anaglyph, full color composite image formed of two non-mutually color exclusive colored images.

47. An apparatus for simultaneously combining one image of an object with another image of the object, said method comprising:
   a. means for directing said one image along a first light ray path;
   b. means for directing said other image along a second light ray path that intersects said first light ray path;
   c. a color filter means disposed at the intersection of the light ray paths to form one color filtered image along only one of the light ray paths,
   d. said color filter means being effective to combine said color filtered image from said only one light ray path with the image from the other light ray path to form a non-anaglyph, full colored composite image having a three-dimensional appearance on a displaying means.

48. The apparatus as set forth in claim 47 wherein said color filter means comprises a red content color filter.

49. The apparatus as set forth in claim 47 wherein said color filter means comprises a blue-content color filter.

50. The apparatus as defined in claim 47 including means for equalizing the length of the light paths of said first and second images within said apparatus.

51. The apparatus as set forth in claim 47 including means for color correction disposed along one of said light ray paths.

* * * * *